A. Miller,
Horse Rake.
No. 86,855. Patented Feb. 9, 1869.
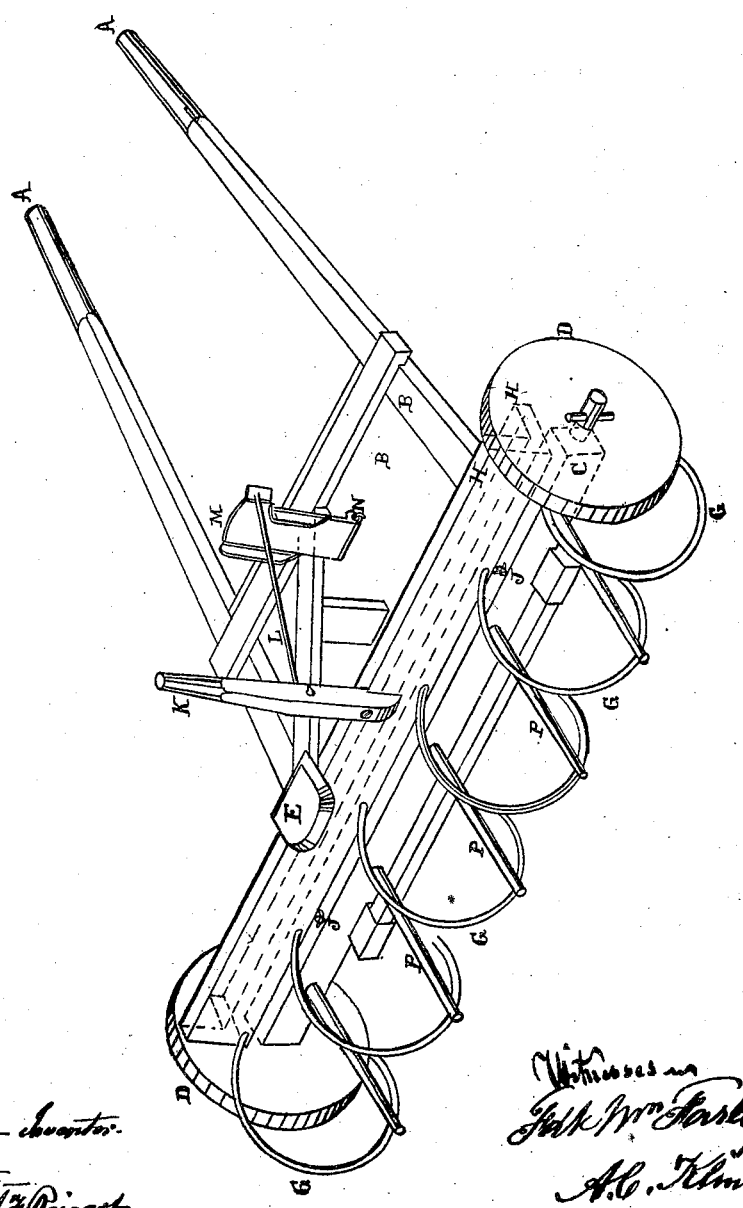
Abraham Miller — Inventor.
By his Atty
J. F. Reigart
Witnesses
Felk Wm Farley
A. C. Klink

UNITED STATES PATENT OFFICE.

ABRAHAM MILLER, OF HAGERSTOWN, MARYLAND, ASSIGNOR TO HIMSELF, WM. H. PROTZMAN, WM. UPDEGRAFF, AND A. R. APPLEMAN.

IMPROVEMENT IN HORSE-RAKES.

Specification forming part of Letters Patent No. 86,855, dated February 9, 1869.

*To all whom it may concern:*

Be it known that I, ABRAHAM MILLER, of Hagerstown, county of Washington, and State of Maryland, have invented an Improved Grain and Hay Rake; and I do hereby declare the following to be an exact description thereof, reference being had to the accompanying drawings, and to the letters of reference marked thereon, making a part of this specification.

The nature of my invention consists in the mode of raising and lowering the teeth by means of the treadle and rod, and operated by the lever attached to the revolving rake-head.

A represents the shafts; B, the frame and platform permanently attached to the carriage-axle C; D, the carriage-wheels; and E, the driver's seat, attached to the platform B; G, the teeth, that are permanently fastened into an angular rake-head, H, that operates on hook and eyes J, secured to the top of the carriage-axle C.

At the rear side of the movable rake-head H, and on the right hand of the driver's seat, is an upright lever, K, near the center of which is attached a connecting-rod, L, that is fastened to the outer corner of the treadle E. The treadle M is a metallic plate, with raised flanges on each side, so as to secure the foot of the operator to the treadle firmly. It is attached at its lower end by a hinge, N, to the platform B, and operates simultaneously with the forward or backward movement of the lever K, and when the teeth are to be relieved of their rakings or load the lever K is drawn forward, while the pressure of the foot on the treadle assists in moving the lever K forward, thereby raising the teeth G upward against the cleaners P, and the rake is cleaned and relieved of its load.

What I claim as my invention, and desire to secure by Letters Patent, is—

The arrangement of the treadle M, attached to the upper side of the platform, in combination with the rod L and lever K, the lever and treadle operating simultaneously in the manner as set forth.

ABRAHAM MILLER.

Witnesses:
   WM. N. TICE,
   THOS. CURTIS.